J. BERG.
COMBINED SADDLE AND JOURNAL BOX.
APPLICATION FILED DEC. 21, 1912.

1,057,402. Patented Apr. 1, 1913.

WITNESSES
Edward Bernstein
J. P. Broddy

INVENTOR
John Berg
by Chrismer
atty.

UNITED STATES PATENT OFFICE.

JOHN BERG, OF TORONTO, ONTARIO, CANADA.

COMBINED SADDLE AND JOURNAL-BOX.

1,057,402.  Specification of Letters Patent.  Patented Apr. 1, 1913.

Application filed December 21, 1912. Serial No. 738,012.

*To all whom it may concern:*

Be it known that I, JOHN BERG, of the city of Toronto, in the county of York and Province of Ontario, Dominion of Canada, have invented certain new and useful Improvements in Combined Saddles and Journal-Boxes; and I hereby declare that the following is a full, clear, and exact description of the same.

My invention particularly relates to that type of saddles and journal boxes used in the construction of rolling stock such as cars, traveling cranes, and the like, continually exposed to severe strains, resulting from an improper distribution of the load, a surging of the car wheels and axles during their travel over uneven tracks, and the jarring of the journals and boxings in the turning of curves, and the object of my invention is to eliminate the troubles originating from these strains, this object being accomplished by making the saddle separable from the journal box and interposing a spherical bearing between the journal box and saddle, this spherical bearing permitting of any reasonable variation of the journal box and saddle from their fixed normal relations to each other without changing the fixed place of load distribution to the journal box.

For an understanding of my invention, reference is to be had to the following description and to the accompanying drawings, in which:—

Figure 1:
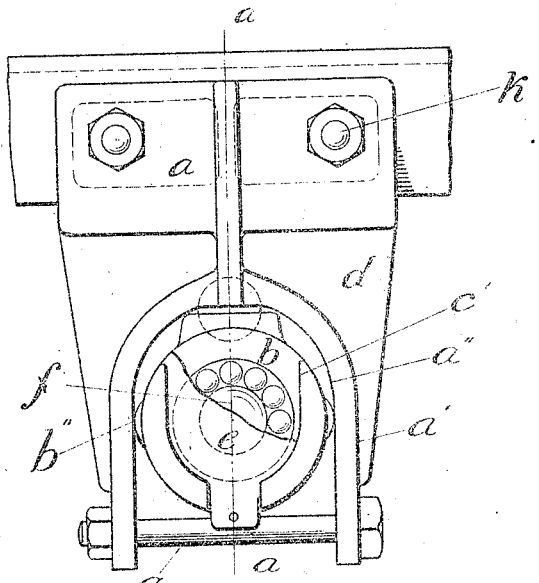
Figure 2:
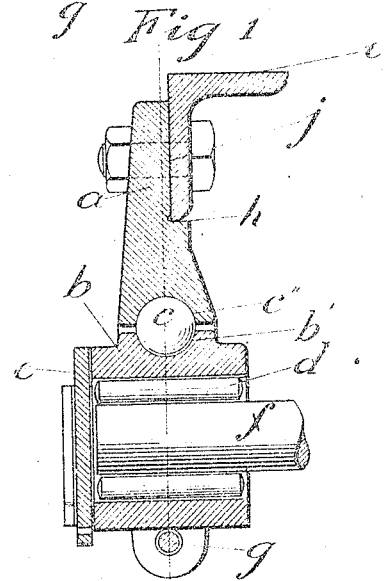

Figure 1, is a broken end elevation of the journal box and saddle; and, Fig. 2, is a vertical section on the line $a$—$a$ Fig. 1.

As the journal box $b$ may be of any ordinary construction, it will not be necessary to describe it further than to mention that it may contain a set of anti-friction rollers $d$ for and in parallel relation with the journal $f$.

Centrally on the top of the journal box is a cup-shaped socket $b'$ in which is seated a spherical bearing $c$, and superposed above, but separate from, the journal box, is the saddle $a$ having two downwardly-extending forks $a'$ located respectively on opposite sides of the journal box $b$, the lower end of the forks $a'$ being slightly below the bottom of the journal box and coupled together by a bolt $g$.

Formed in the saddle $a$, centrally of the fork-arch $a''$, is a cup-shaped socket $c''$ which, when the saddle and journal box are assembled, registers with the cup-shaped socket $b'$ and contains the upper part of the spherical bearing $c$.

The advantages of the foregoing construction are as follows:—When the saddle occupies its fixed normal relation to the journal box $b$, the strain of the load is transmitted by the spherical bearing $c$ axially to the cup-shaped socket $b'$ which, being centrally located with relation to the journal box, effects an even distribution of the load throughout the length of the bearing rollers $d$ and causes the bearing rollers to maintain their parallel relation with the journal $f$. When the saddle is moved to the right or left of the fixed position shown in Fig. 2,—*i. e.* when the saddle is forced outward or inward from its vertical axis, the strain of the load will still be transmitted to the spherical bearing $c$, and by it, to the cup-shaped socket $b'$ and the journal box $b$, the place of contact between the spherical bearing and cup-shaped socket being the same as in the previous instance, and when the saddle is moved to the right or left in Fig. 1, the distribution of the load to the journal box is in exactly the same place.

In order to insure the unimpeded distribution of the load by the spherical bearing $c$ to the cup-shaped socket $b'$ and journal box $b$, a clearance $c''$ is provided between the top of the fork-arch $a''$ and the top of the journal box, this clearance permitting of a limited oscillating movement of the saddle $a$ within reasonable bounds before coming into contact with the journal box when the saddle moves in any direction from its fixed normal position. By this construction, I am able to eliminate an uneven distribution of the load to the journal box, and I am also able to prevent any variation of the parallel relation to the bearing rollers $d$ and journal $f$ to each other, and consequently I am able to move the car with a minimum of power, which in itself is an important feature, particularly when the car is manually moved.

When the cars are used for the purpose of carrying heavy loads, it frequently happens that the load on the car body causes the car beams $i$ to sag inward, sometimes breaking the bolts $k$, and always causing them to become loose, which in the common type of journal boxes and saddles, intensifies the trouble resulting from the jamming or straining of the boxings, but with my present invention, a trouble of this kind is taken care of by the spherical bearings c.

To simplify the construction of the car, I preferably form on the inner face of the saddle, a, as shown in Fig. 2 of the drawings, a shouldered abutment h interjacent the fork-arch a'' and the top of the saddle, and I preferably use an angular beam i and fasten its vertical flange j to the saddle by means of the bolts k, the lower end of the vertical flange j resting upon the shouldered abutment h which, with the bolts k, transmit the load from the angular beam i to the saddle a. It might be stated with respect to this construction that the employment of the spherical bearings c obviates the necessity of having the saddle a and beam i in perfectly plumb relation with the journal box, and this is an important feature in view of the fact that in previous constructions, it has been necessary to employ means for bringing these parts into plumb relation. By making the beams i separate from the saddle a, it is possible to renew the beams from time to time as they become bent or twisted without having to renew the saddle which may be in a perfect state of repair.

By making the journal box b separate from the saddle a, it is possible to renew the journal box without having to renew the saddle, thus economizing in the cost of repairs, as when the car is used for the carrying of granular material such as bricks, sand and the like, the granular material finds its way into the journal box in spite of the greatest precautions which can be taken to exclude it, and during the constant use of the car, this granular material ultimately cuts away the journal and bearing rollers.

In order to exclude the sand, etc., from the bearing rollers, I have provided the journal box b with a sliding cap c which, being readily removable, allows of access to the journals for lubrication and other purposes.

Having thus fully described the nature of my invention, what I claim as new and desire to secure by Letters Patent, is:—

1. In the hereindescribed device, the combination of a journal box, a superposed saddle associated therewith, and a ball and socket support for the saddle carried by the journal box whereby they may change in their fixed relations to each other without changing the place of load distribution to the journal box.

2. In the hereindescribed device, the combination of a journal box, a superposed saddle rockably mounted on the journal box, and a spherical bearing interposed between the saddle and journal box, said spherical bearing fixedly maintaining the place of load distribution to the journal box.

3. In the hereindescribed device, the combination of a journal box having an exteriorly-formed ball cup, a saddle associated with said journal box and having a ball cup registering with the ball cup of the journal box, and a ball contained in said ball cups rockably supporting the saddle from the journal box.

4. In the hereindescribed device, the combination of a journal box having an exteriorly-formed ball cup, a saddle associated with said journal box and having a ball cup registering with the ball cup of the journal box, and a ball contained in said ball cups rockably supporting the saddle from the journal box, said saddle having two downwardly-extending forks located on opposite sides of the journal box, and a coupling element uniting said forks below the journal box.

5. In the hereindescribed device, the combination of a journal box, a superposed saddle associated therewith, said saddle having a shouldered support interjacent its upper and lower ends, an angular supporting element secured to said saddle, the lower end of the vertical arm of said element resting upon said shouldered support, and anti-friction means interposed between the saddle and journal box permitting them to change their fixed relations to each other without changing the place of load distribution to the journal box.

6. In the hereindescribed device, the combination of a journal box, a superposed saddle associated therewith, and a ball and socket support for the saddle carried by the journal box whereby they may change their fixed relations to each other without changing the place of load distribution to the journal box, said saddle having a shouldered support interjacent its upper and lower ends, and an angular supporting element secured to the saddle, the lower end of the vertical arm of said element resting upon said shouldered support.

7. In the hereindescribed device, the combination of a journal box having an exteriorly-formed ball cup, a saddle associated with said journal box and having a ball cup registering with the ball cup of the journal box, and a ball contained in said ball cups rockably supporting the saddle from the journal box, said saddle having a shouldered support interjacent its upper and lower ends, and an angular supporting element secured to said saddle, the lower end of the vertical arm of said element resting upon said shouldered support.

8. In the hereindescribed device, the combination of a journal box having an exteriorly-formed ball cup, a saddle associated with said journal box and having a ball cup registering with the ball cup of the journal box, and a ball contained in said ball cups rockably supporting the saddle from the journal box, said saddle having a shouldered support interjacent its upper and lower ends, an angular supporting element secured to said saddle, the lower end of the vertical arm of said element resting upon said shouldered support, said saddle having also two downwardly-extending forks located on opposite sides of the journal box, and a coupling element uniting said element below the journal box.

Toronto, December 18th, 1912.

JOHN BERG.

Signed in the presence of—
C. H. RICHES,
EDWARD BERNSTEIN.